Feb. 28, 1950   H. PLANTET   2,499,036
ELECTROMAGNETIC CLUTCH
Filed June 27, 1946   3 Sheets-Sheet 1
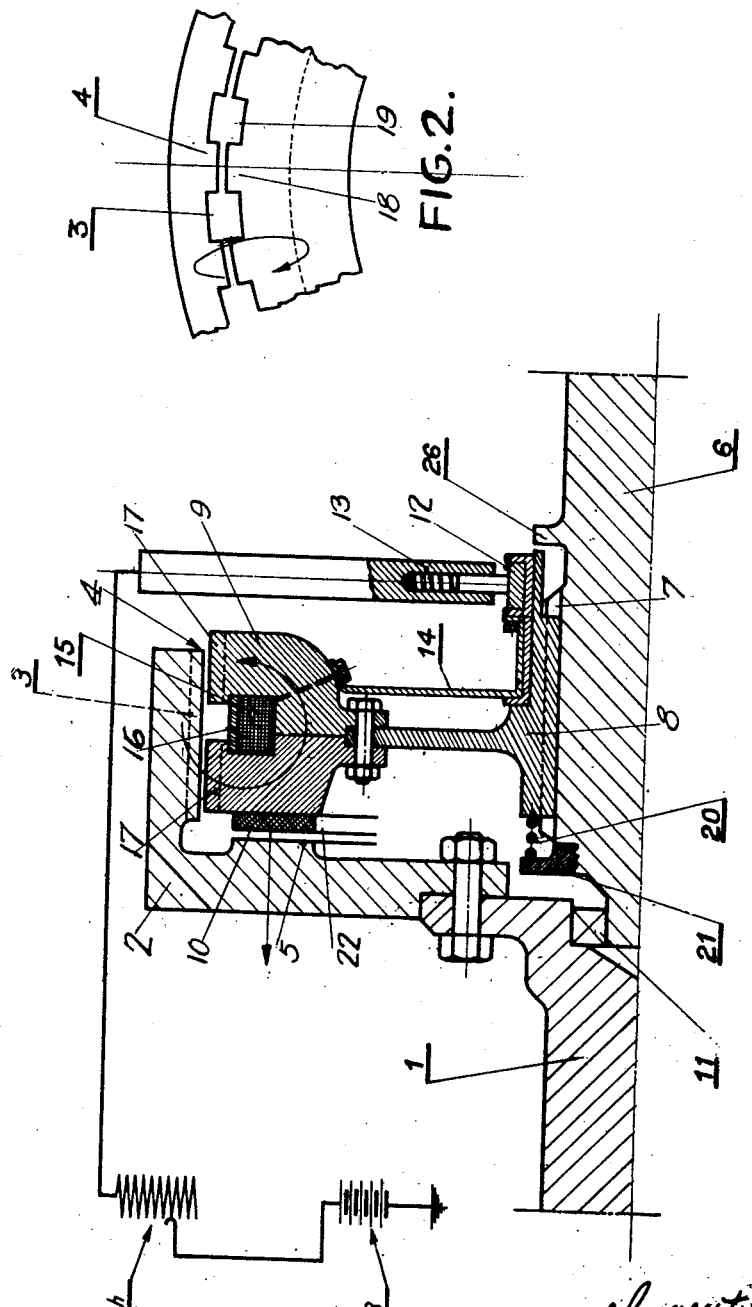

Feb. 28, 1950 H. PLANTET 2,499,036
ELECTROMAGNETIC CLUTCH
Filed June 27, 1946 3 Sheets-Sheet 2

Inventor:
H. Plantet,
By E. F. Wenderoth
Atty

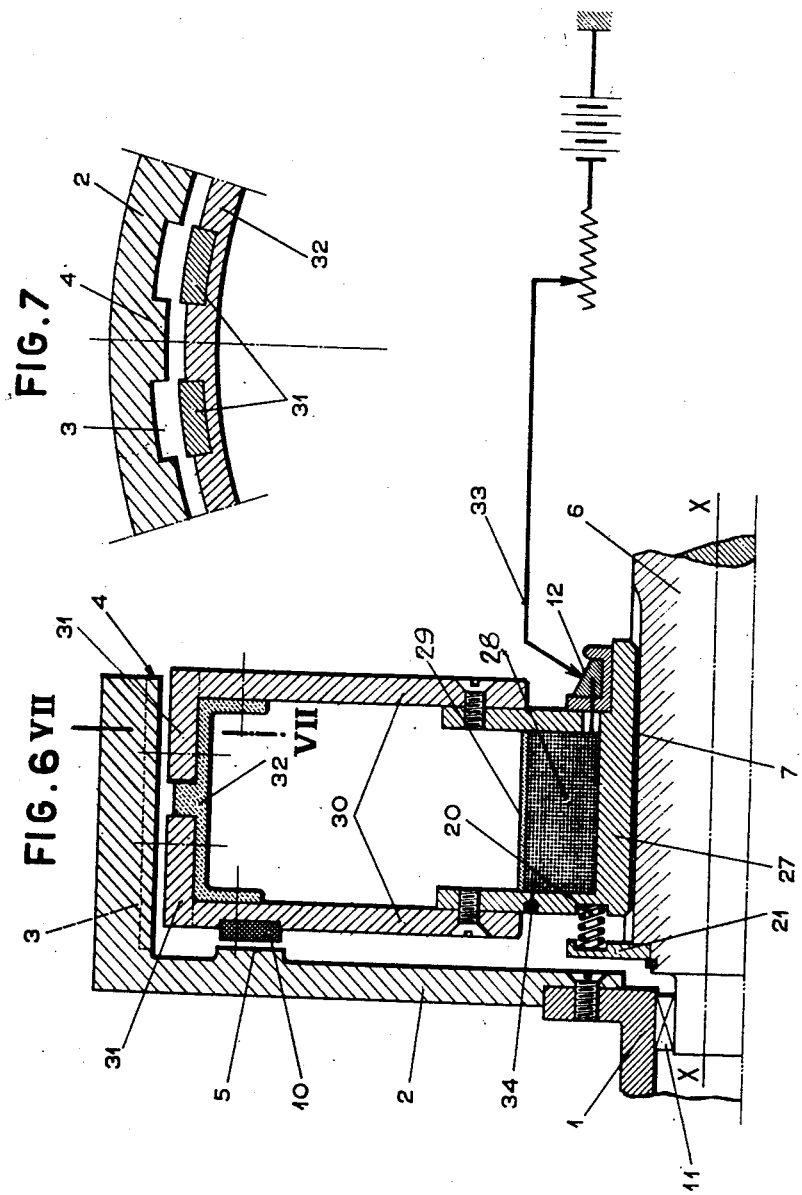

Patented Feb. 28, 1950

2,499,036

UNITED STATES PATENT OFFICE 2,499,036

ELECTROMAGNETIC CLUTCH

Henry Plantet, Paris, France, assignor to Societe E. P. I. C. (Electricite, Produits Industriels et Chimiques), Neuilly-sur-Seine, France, a French corporation Application June 27, 1946, Serial No. 679,641
In France August 31, 1944

Section 1, Public Law 690, August 8, 1946
Patent expires August 31, 1964

10 Claims. (Cl. 172—284)

1

Electromagnetic clutches are already known which, in contradistinction to mechanical clutches which ensure a positive connection between two shafts with or without torque vibration damping, function without an effective connection between the driving and driven elements. In these electromagnetic clutches the drive is ensured by a torque resulting from the magnetic field set up through the air gap separating the driving and the driven elements. Having regard, on the one hand, to the load torque and, on the other hand, to the inertia of the elements in rotation, these appliances generally exhibit the two following characteristics when functioning in the clutch position:

a. Permanent sliding, the value of which is a function of the difference existing between the driving torque $Cm$ and the effective load torque $Cr$. This sliding motion which is a deleterious characteristic of this type of clutch, becomes nil when the load torque itself is nil.

b. An appreciable reduction in the oscillations due to the torque vibrations (set up for example by piston driven heat engines).

The present invention has for an object the provision of an electromagnetic clutch which will completely eliminate the drawback referred to under a above and which will secure to a certain extent the benefits of the advantage referred to under b above. The present invention substantially reduces any sliding in the clutched position and at the same time permits damping the transmission of any oscillations due to torque vibrations.

The new electromagnetic clutch is characterised essentially by the fact that the driving and the driven elements keyed on the driving and driven shafts and which are never in engagement one with the other, consist of circular coaxial bodies of magnetic material having teeth opposite to each other, one of the bodies serving as the armature whilst the other serving as the electromagnet is provided with an annular coil adapted to be fed with a current of variable intensity. Means are, moreover, provided between the driving and the driven elements for damping the transmission of oscillations to which reference has been made above.

In a first embodiment and a first variant, the exciter coil of the electromagnet is located close to the periphery of the rotor.

In another modified embodiment, the exciter coil referred to above is located in an initial position, which causes the masses to approach the axis of the mechanism, for the purpose of:

2

Reducing the inertia of the moving parts of the mechanism;

Reducing the length of the conductor forming the coil notwithstanding the greater length of the magnetic circuit;

Finally, permitting the widening of the air gap as a result of the increase in the number of turns in the coil, the mean length of which may be shorter than that of the above-mentioned coil without there being however any increase in the current consumption.

In the accompanying drawing, three embodiments are shown diagrammatically and by way of example but not limitation.

Fig. 1 is an axial longitudinal section of half of a first embodiment of the apparatus;

Fig. 2 is a front elevation of a part of the toothed magnetic circuit, the teeth of the driving and driven elements being opposite to each other;

Fig. 6 is an axial longitudinal section of half a second modified embodiment of the apparatus;

Figure 4:
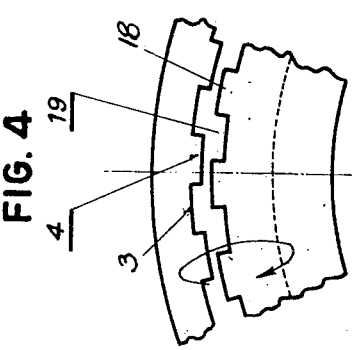
Fig. 4 is a similar view to Fig. 2, the teeth of the driving and the driven elements being staggered.

Finally, Fig. 7 is a partial section on the line VII—VII of Fig. 6.

In the embodiment shown in Fig. 1, the driving portion of the clutch consists of an armature 2 made of magnetic steel possessing good permeability acting as a fly wheel and mounted on the driving shaft 1. The notches 3 in suitable number are cut on the internal cylindrical portion of the armature in such a manner as to obtain the teeth 4 forming the polar plates. The notches may be either parallel to the generatrices of the cylindrical surface or be inclined at a suitable pitch. The armature cover incorporates a polished surface 5 perfectly trued perpendicularly to the axis.

The driven member consists of a hub 8 acting as a core adapted to slide freely by means of grooves 7 on the driven shaft 6. The hub 8 carries an electromagnet 9 integral with a crown wheel (or disc) 10 of material possessing a suitable coefficient of friction and arranged opposite to the trued surface 5.

The shafts 1 and 6 are maintained in perfect alignment and are centered relatively to each other by means of a bearing or a ring 11.

The hub 8 comprises a collector ring 12 serving to feed the coil of the electromagnet 9 through a friction unit 13 connected to a source of current B through a rheostat Rh. The ring 12 is connected to the above mentioned coil by a rod 14 or any other suitable conductor.

The electromagnet 9 is made of two half rotating pole plates, assembled along a jointed surface trued as perfectly as possible and in the inside of which is housed the electromagnet coil 15 held by means of a binding 16 of non-magnetic material held in position by the pole pieces 17 of the above mentioned pole plates. The pole pieces 17 have teeth 18 equal in number to the teeth 4 formed in the cylindrical outer portion of the pole pieces 17 by notches 19 corresponding to the notches in the armature 2.

A spring 20 bearing on a circular abutment on the shaft 6 maintains the hub 8 in the position shown on the drawing, that is to say in such a position that the electromagnet 9 is slightly staggered outwardly with respect to the armature 2 when it is not excited. This position is controlled by a stop 26 on the shaft 6.

The new clutch is based on the application of the property inherent in a magnetic circuit of occupying such a position that the reluctance of the circuit as a whole is as low as possible. The supply of current to the coil 15 has the effect of setting up a torque which tends to position the electromagnet 9 relatively to the armature 2 in such a way that the axes of the teeth 4 and 18 coincide.

Figure 5:
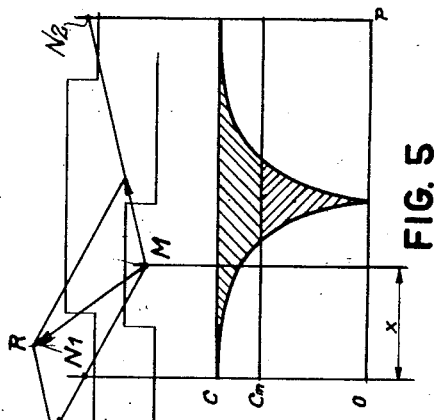
Fig. 5 shows diagrammatically and in elevation a part of the teeth of the driving and the driven elements and the diagram of the resultant torque.

The effect of the teeth on each other emerges clearly from the diagram in Figure 5 which shows in perspective two consecutive teeth of the armature 2 having centres of attraction N1 and N2 and one tooth of the electromagnet having a centre of attraction M where N1—N2 is the polar pitch of the armature and $x$ the distance from N1 to M as the starting point of the abscissa. Owing to the field set up by M, the magnetic masses $n1$ and $n2$ shown at N1 and N2 are subjected to two forces $f1$ and $f2$ directed according MN1 and MN2. These forces have a resultant R which sets up a torque $Cx=F(x)$ for a given value of the current intensity in the coil.

Let $Cm$ be the corresponding mean torque, the value of which is defined by the expression:

$$Cm = \frac{1}{P}\int_0^P F(x)dx$$

As a result, the driven shaft 6 is entrained by the driving shaft 1.

A second effect of the setting up of the field in the magnetic circuit comprising the electromagnet 9 and the armature 2 is to bring about a longitudinal displacement of the electromagnet 9 as a whole and of its sliding hub 8 by reason of the force of attraction of the electromagnet 9 staggered relatively to the armature 2. The above mentioned longitudinal displacement has the effect that the outer surface of the crown wheel or disc 10 rubs against the trued surface 5 of the armature 2.

The pressure between the elements 5 and 10 is a function of the stagger of the elements 2 and 9 of the excitation current intensity. The resultant auxiliary torque which in turn is a function of that pressure and the coefficient of friction of the materials in contact cooperates in ensuring a drive under stable conditions. This auxiliary torque is so determined that the torque vibrations due to any irregularities in the driving element are only partially transmitted to the driven element.

Figure 3:
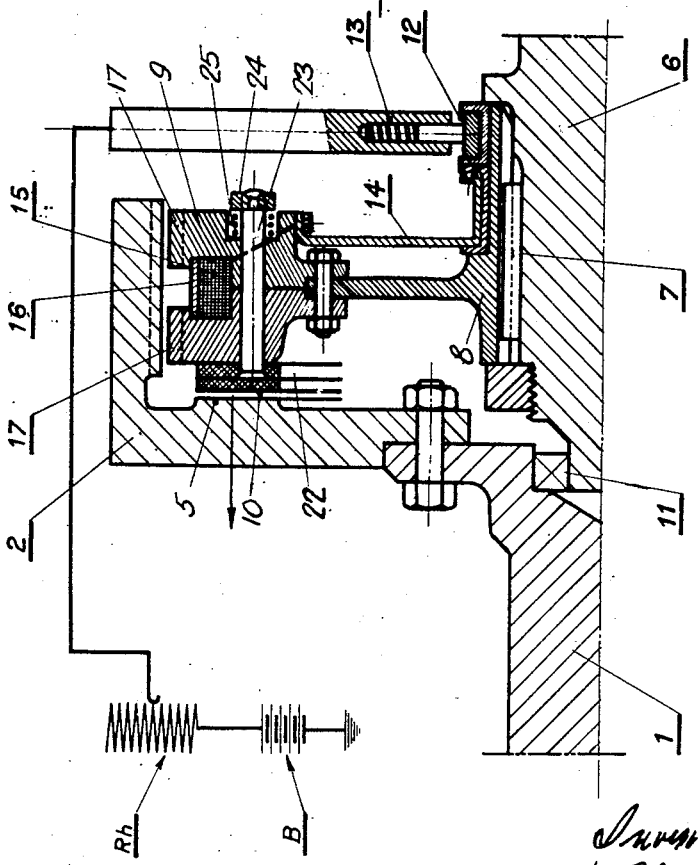
Fig. 3 is a similar view to Fig. 1 of a modified embodiment.

In the modified embodiment shown in Figure 3, the hub 8 of the electromagnet 9 is rigidly secured on the shaft 6 and is unable to carry out any sliding movement. In order to obtain contact between the elements 5 and 10, a lighter unit has been provided incorporating a driving disc 22 (on which is fixed the crown wheel 10) actuated by push rods 23 which disconnect the magnetic circuit. These push rods and the disc 22 are made of non-magnetic material. Secured to the other end of the push rods 23 are magnetic plates 24 subjected to the action of the springs 25. When the electromagnet is not excited, the disc 22 is attracted against the electromagnet 9 by the springs 25; when the electromagnet 9 is excited the plates 24 attracted by the magnetic field are displaced to increase the permeability of the magnetic circuit and impart motion to the mobile unit with which they are integral. The elements 5 and 10 then come into contact as before.

In the majority of cases the various elements are so dimensioned that the pressure exerted between the friction elements 5 and 10 is slight.

In these conditions and in addition to its normal function of limiting the instantaneous torque whether periodical or not, the clutch obviates any interruption or damage to the transmission. If one of the two shafts (driving or driven) is subjected occasionally during a finite time to a torque exceeding the maximum torque normally provided for, no damage will be caused to the clutch itself.

It is possible to reverse the functions of the driving and driven shafts. In like manner, it is also possible in either case to reverse the relative positions of the electromagnet and the armature, that is to say to place the electromagnet outside the armature.

Where the armature is integral with the driving shaft, a clutch is obtained in which the driven portion has a very small inertia, an arrangement which may be of interest for certain applications.

In the modified embodiment shown in Figures 6 and 7, the driving part of the clutch likewise consists of an armature 2 of steel of good magnetic permeability serving as a fly wheel and mounted on the driving shaft 1. Notches 3 of suitable number are cut in the cylindrical internal portion of the armature so as to obtain teeth 4 forming pole plates. The above mentioned notches may be either parallel to the generatrices of the cylindrical surface or be inclined at a suitable pitch. The armature cover incorporates a polished surface 5 perfectly trued perpendicularly to the axis.

The driven member (electromagnet) consists of a core 27 adapted to slide by means of channels 7 on the driven shaft 6. The core 27 carries the electromagnet coil 28 housed in an annular groove of the said core and maintained in position by means of a binding 29 of magnetic material. In contrast to the arrangement provided in the two first embodiments, the coil 28 is located near to the axis and not in the peripheral portion. On the core 27 are mounted two end plates 30 of sheet metal, for example, the periphery of which incorporates notches intended to form teeth 31 equal in number to the teeth 4 in the armature 2. A member 32 of non-magnetic metal covers the aperture between the two end plates 30 and prevents distortion of the teeth 31 under the action of the centrifugal force.

For the purpose of damping the resonance effects inside the above mentioned cavity, recourse may be had to any suitable soundproofing means.

One of the end plates (that turned towards the disc-shaped part of the armature 2) carries a crown wheel 10 of material having a suitable coefficient of friction arranged opposite to the trued surface 5.

The alignment of the shafts 1 and 6 is ensured by means of a bearing or a ring 11, the inoperative position of the electromagnet on the shaft 6 being ensured by springs 20 impinging against a bearing ring keyed on the shaft 6. Finally, a ring 12 serves, through the intermediary of a brush 33 for feeding the exciter coil 28 earthed at 34. It will be clearly understood that the current return can be affected by means of a second ring cooperating with a second brush.

It will be seen that thanks to the proximity of the electromagnet coil 28 to the axis of rotation X—x of the system a reduction is obtained in the moment of inertia simultaneously with a reduction of the length of the conductor, in spite of the greater length of the magnetic circuit and the number of coils can be appreciably increased (although the length of the winding wire is less than in the previous device).

It will be obvious that the three embodiments of the device described above and shown in the accompanying drawing are merely given by way of indication and not limitation and that the device may undergo any modifications of detail without thereby departing from the scope of the invention.

What I claim is:

1. In an electromagnetic clutch wherein an air gap is maintained between the main driving and driven elements the combination of a ring-shaped armature having notches therein forming teeth, a coaxial ring-shaped electromagnet cooperating with said armature and movable with respect to it, said electromagnet comprising two half pole plates and a coil housed in said pole plates, said pole plates having teeth thereon corresponding to said first-mentioned teeth and being located opposite thereto, first frictional contact means on said armature and second frictional contact means on said electromagnet adapted to frictionally engage said first means, said second means being concentric with and in front of said first means and said second means being directly and automatically operated by said electromagnet, both of said first and second means being adapted to dampen vibrations and avoid permanent sliding.

2. In an electromagnetic clutch wherein an air gap is maintained between the main driving and driven elements the combination of a ring-shaped armature having notches therein forming teeth, a coaxial ring shaped electromagnet cooperating with said armature and movable with respect to it, said electromagnet comprising two half pole plates and a coil housed in said pole plates, said pole plates having teeth thereon corresponding to said first-mentioned teeth and being located opposite thereto, first frictional contact means on said armature, second frictional contact means on said electromagnet adapted to frictionally engage said first means, said second means being concentric with and in front of said first means and said second means being directly and automatically operated by said electromagnet, both of said first and second means being adapted to dampen vibrations and avoid permanent sliding, and means for removing said first and second frictional contact means from operation during non-operation of said clutch.

3. In an electromagnet clutch wherein an air gap is maintained between the main driving and driven elements the combination of an armature, an electromagnet cooperating with said armature and movable with respect to it, a friction surface upon said electromagnet, a surface upon said armature concentric with and in front of said friction surface and adapted to frictionally engage said friction surface to reduce vibrations and to avoid permanent sliding, said electromagnet being disposed with respect to its cooperating armature so as to bring automatically said surfaces in contact during operation of said clutch, and means for separating said surfaces during non-operation of said clutch.

4. In an electromagnetic clutch wherein an air gap is maintained between the main driving and driven elements the combination of a ring-shaped armature having teeth thereon, a coaxial ring-shaped electromagnet cooperating with said armature having teeth similar and equal in number to said first-mentioned teeth located opposite thereto, a shaft upon which said armature is mounted, a coaxial shaft upon which said electromagnet is slidingly mounted, a friction surface upon said electromagnet, a surface upon said armature cooperating with said friction surface to reduce vibrations and to avoid permanent sliding. said electromagnet being disposed with respect to its cooperating armature so as to bring automatically said surfaces in contact during operation of said clutch by moving said electromagnet on its shaft towards said armature, and means acting upon said electromagnet to separate said surfaces during non-operation of said clutch by moving said electromagnet on its shaft away from said armature.

5. In an electromagnetic clutch wherein an air gap is maintained between the main driving and driven elements the combination of a ring-shaped armature having teeth thereon, a coaxial ring-shaped electromagnet cooperating with said armature and having teeth similar to and equal in number to said first-mentioned teeth located opposite thereto, a shaft upon which said armature is mounted, a coaxial shaft upon which said electromagnet is slidingly mounted, a friction surface upon said electromagnet located at right angles to said shafts, a trued surface upon said armature located at right angles to said shafts cooperating with said friction surface to reduce vibrations and to avoid permanent sliding, said electromagnet being disposed with respect to its cooperating armature so as to bring automatically said surfaces in contact when said clutch is in clutched position by moving said electromagnet on its shaft towards said armature, and means acting upon said electromagnet to separate said surfaces when said clutch is in unclutching position by moving said electromagnet on its shaft away from said armature.

6. In an electromagnetic clutch wherein an air gap is maintained between the main driving and driven elements the combination of a ring-shaped armature having teeth thereon, a coaxial ring-shaped electromagnet cooperating with said armature and having teeth similar to and equal in number to said first-mentioned teeth located opposite thereto, a shaft upon which said armature is mounted, a coaxial shaft upon which said electromagnet is slidingly mounted, a friction surface upon said electromagnet located at right angles to said shafts, a trued surface upon said armature located at right angles to said shafts cooperating with said friction surface to reduce vibrations and to avoid permanent sliding, said electromagnet being staggered with respect to its cooperating armature so as to be axially displaced when energized, whereby said surfaces are automatically brought in contact when said clutch is in clutched position, and a spring acting upon said electromagnet to separate said surfaces when said clutch is in unclutching position by moving said electromagnet on its shaft away from said armature.

7. In an electromagnetic clutch wherein an air gap is maintained between the main driving and driven elements the combination of a ring-shaped armature having teeth thereon, a coaxial ring-shaped electromagnet cooperating with said armature having teeth similar to and equal in number to said first-mentioned teeth and located opposite thereto, a shaft upon which said armature is fixedly mounted, a second shaft upon which said electromagnet is fixedly mounted, a non-magnetic disc support mounted upon said electromagnet, non-magnetic rods slidingly mounted in said electromagnet supporting said disc support, magnetic plates fixed to the free ends of said rods, springs normally urging said plates away from said electromagnet, a friction surface mounted upon said disc support and a cooperating surface located upon said armature whereby during operation of said clutch and when said electromagnet is energized said rods are automatically drawn towards said electromagnet by said plates thereby bringing said surfaces into contact to diminish vibrations and avoid permanent sliding.

8. An electromagnetic clutch as set forth in claim 1 wherein a binding maintains said coil housed in said pole plates and a ring and brush connection is used for supplying current to said coil.

9. In an electromagnetic clutch wherein an air gap is maintained between the main driving and driven elements the combination of a driving shaft, a ring-shaped armature having teeth thereon fixed to said shaft, a driven shaft, a ring-shaped electromagnet slidingly mounted upon said driven shaft, said electromagnet comprising an annular core member, a coil mounted in said core adjacent said driven shaft, sheet metal end plates mounted upon said core member, said metal plates having notches therein at the periphery thereof defining teeth cooperating with the teeth upon said armature and a cylindrical member of non-magnetic metal joining the exterior perimeter of said plates.

10. An electromagnetic clutch as set forth in claim 9 wherein said armature and said electromagnet are provided with cooperating friction surfaces for reducing vibrations.

HENRY PLANTET.

REFERENCES CITED

The following references are of record in the file of this patent:

UNITED STATES PATENTS

| Number | Name | Date |
|---|---|---|
| 1,056,545 | Heubner | Mar. 18, 1913 |
| 1,077,805 | Collier | Nov. 4, 1913 |
| 1,548,016 | La Riboisiere | July 28, 1925 |
| 1,622,261 | Payne | Mar. 22, 1927 |
| 1,665,613 | Tanner | Apr. 10, 1928 |
| 1,756,907 | Payne | Apr. 29, 1930 |
| 1,760,223 | Wittkuhns | May 27, 1930 |
| 1,825,934 | Bing | Oct. 6, 1931 |
| 2,392,148 | Hornbostel | Jan. 1, 1946 |